Oct. 12, 1954 W. D. POOLE 2,691,261
ADJUSTING MEANS FOR ROOT HARVESTERS
Filed April 26, 1951 4 Sheets-Sheet 2

INVENTOR
Wiley D. Poole
BY
ATTORNEYS

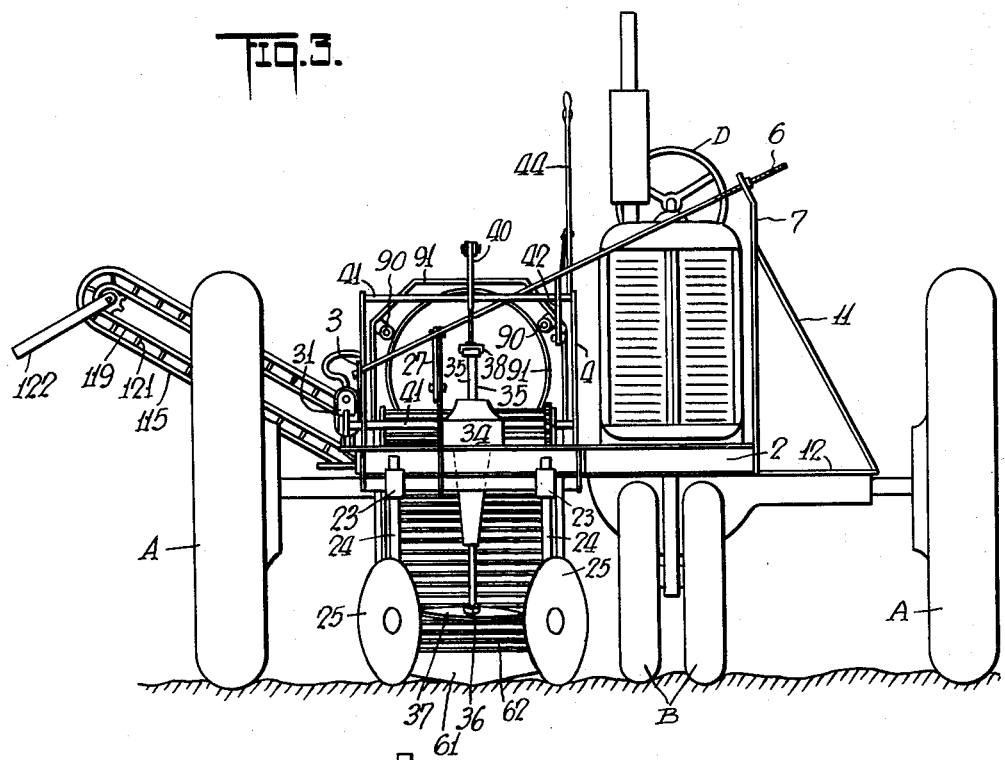
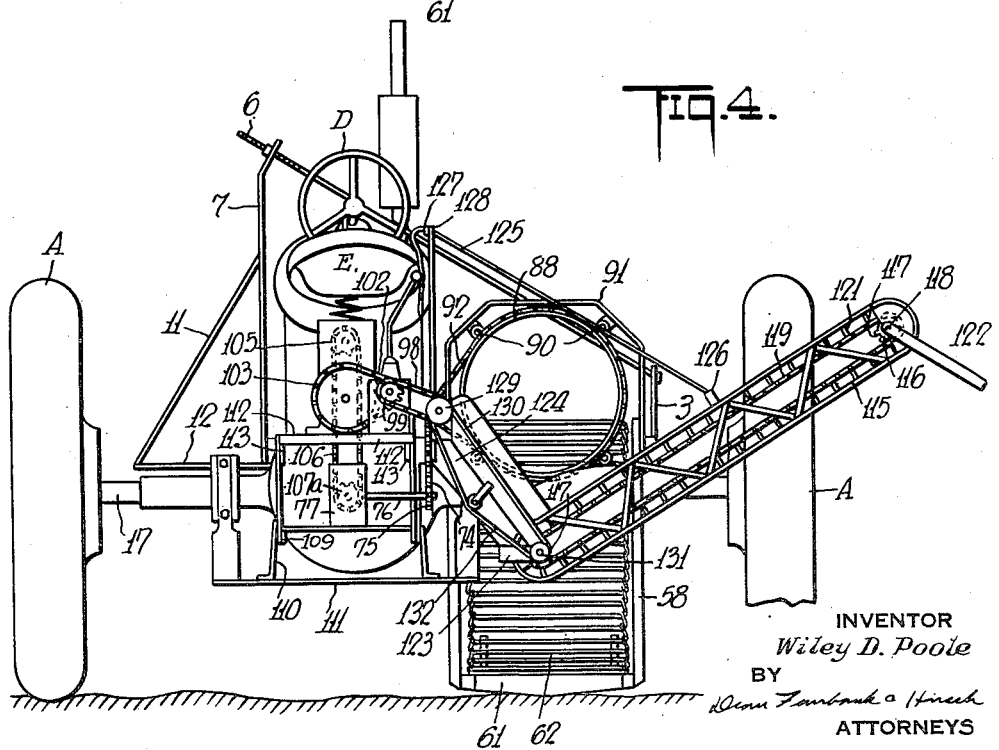

Oct. 12, 1954
W. D. POOLE
2,691,261
ADJUSTING MEANS FOR ROOT HARVESTERS
Filed April 26, 1951
4 Sheets-Sheet 4
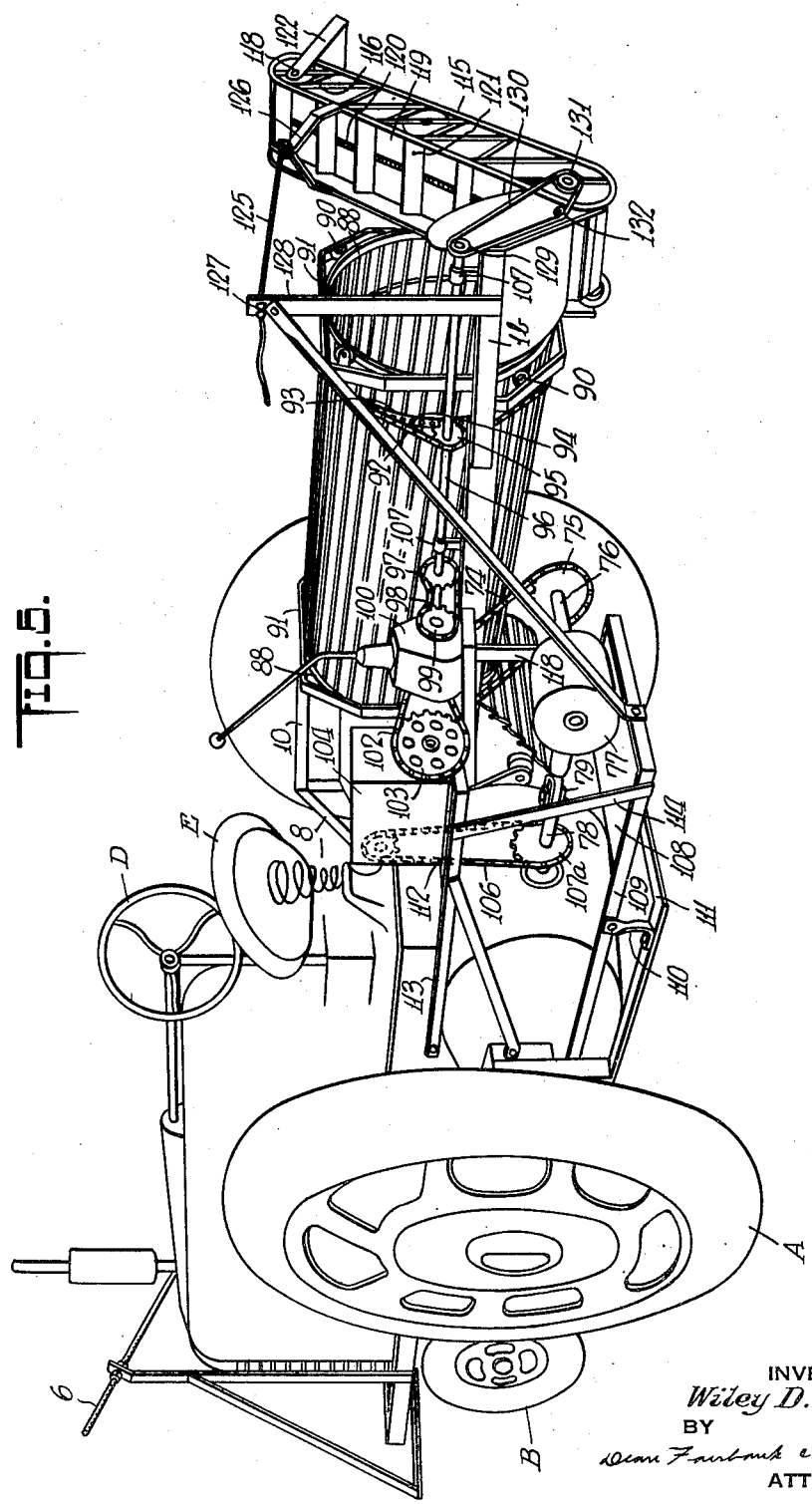
INVENTOR
*Wiley D. Poole*
BY
*Dean Fairbank & Hirsch*
ATTORNEY Patented Oct. 12, 1954

2,691,261

UNITED STATES PATENT OFFICE 2,691,261

ADJUSTING MEANS FOR ROOT HARVESTERS

Wiley D. Poole, Baton Rouge, La., assignor to Board of Supervisors of Louisiana State University and Agricultural and Mechanical College, Baton Rouge, La.

Application April 26, 1951, Serial No. 222,985

2 Claims. (Cl. 55—51)

This invention relates to harvesters for root crops, and of the general type shown in my prior application Serial No. 150,987 which issued as Patent No. 2,666,286 on January 19, 1954, in which there are employed a pair of cutters, coulters, plows, or analogous devices for removing or pushing sideways the soil at the sides of a row of plants, and also cutting vines, weeds, grass, etc., so that they will not tend to hang on the device which lifts the roots and delivers them to a conveyor composed of slats or bars which carry the roots rearwardly from the scoop and permit loose dirt to fall out.

The term "root" as herein used is to be understood as including those parts of a plant which grow underground, and which constitute the desired crop. It includes the whole roots, such as beets, and also the desired parts which are directly connected to the roots, such as tubers and bulbs.

The main object of the present invention is to provide a new and improved type of apparatus which has a specially designed frame that can be mounted on a standard two row tricycle type farm tractor. In this frame there are mounted the various operating parts whereby the one riding on and controlling the vehicle may control the operation of the harvester.

In my improved machine I employ any well known type of discs, coulters, or analogous devices which serve to push the soil sideways from a row of plants, so that there will be as little as possible of excess soil which must be later separated from the roots. They also serve to cut vines, weeds, grass, etc., so that they will not tend to hang on the side frames holding the shovel scoop.

As one important feature of my invention means are provided whereby before the roots are loosened the tops of the plants are cut off reasonably close to the ground. For this purpose there is preferably provided a cutting disc rotatable about a substantially vertical axis so that the plant tops which tend to fall onto the cutter are thrown laterally and out of the path of the scoop or digger which loosens and picks up the roots and moves them upwardly and rearwardly.

As a further feature, means are provided whereby the operator on the machine may readily adjust the elevation of the top cutter to keep it as close to the ground as desired.

As a further feature there is provided a relatively short rotary drum open at both ends and having a reticulated peripheral wall, the axis of the drum extending in the general direction of the length of the vehicle but slightly inclined so that as the roots which are delivered into the upper front end of the drum tumble about as they move through the drum. Thus the dirt is rattled loose from the roots and falls through the openings in the wall of the drum and back to the ground, while the roots move progressively toward the rear end where they are discharged.

In my machine there is provided a root digging and elevating means which removes the roots from the soil, carries the roots upwardly and rearwardly, and discharges them into the drum, and means are provided which while elevating them rattles loose the soil which adhered to the roots and was lifted along with them.

As a further feature, the discs or coulters which cut the soil and push it away from the embedded roots, and the root digger, are interconnected so that in traveling to and from a field they may be simultaneously raised and held in inoperative position.

As a further feature all of the adjustable operating parts of the root harvester have control members positioned adjacent to the seat for the driver of the tractor, so that from one position he may guide and control the speed of the vehicle and stop, start or regulate the operating parts of the harvester.

As a further feature, the roots discharged from the drums are conveyed upwardly and laterally, so that they may be dropped into a wagon or other vehicle traveling alongside of the harvester. Thus, when one vehicle is loaded, another one may be brought in position without more than momentarily interfering with continuous operation.

As a further feature, the operating parts are supported on the tractor and are driven by the engine of the tractor.

The apparatus in its preferred form embodies various other important features which will be apparent from or be pointed out in connection with the following description of only one of various different embodiments of the invention illustrated in the accompanying drawings, in which:

Fig. 1a shows the terminal portion of the discharge elevator.

Fig. 3 is a front view, on a slightly smaller scale;

Fig. 4 is a rear view on the same scale as Fig. 3, and

Fig. 5 is a perspective view of the rear portion of the machine.

The specific form of root harvester illustrated is for use with a type of tractor which has relatively large main rear wheels A spaced apart to bridge two rows of plants, and front steering wheels B relatively close together and laterally offset from the center line of the tractor so as to travel along a row from which the roots have been harvested, while the roots are being harvested from an adjacent row. The motor beneath the hood C serves both to advance the harvester and to drive the operating parts thereof. The tractor has a steering wheel D which may be operated by the driver riding on the seat E. No novelty is claimed as to any details of the particular type of tractor, but my improved harvester, in the form illustrated, is designed to be mounted on a tractor of this type, with the various control parts of the harvester in easy reach of the driver of the tractor.

Figure 1:
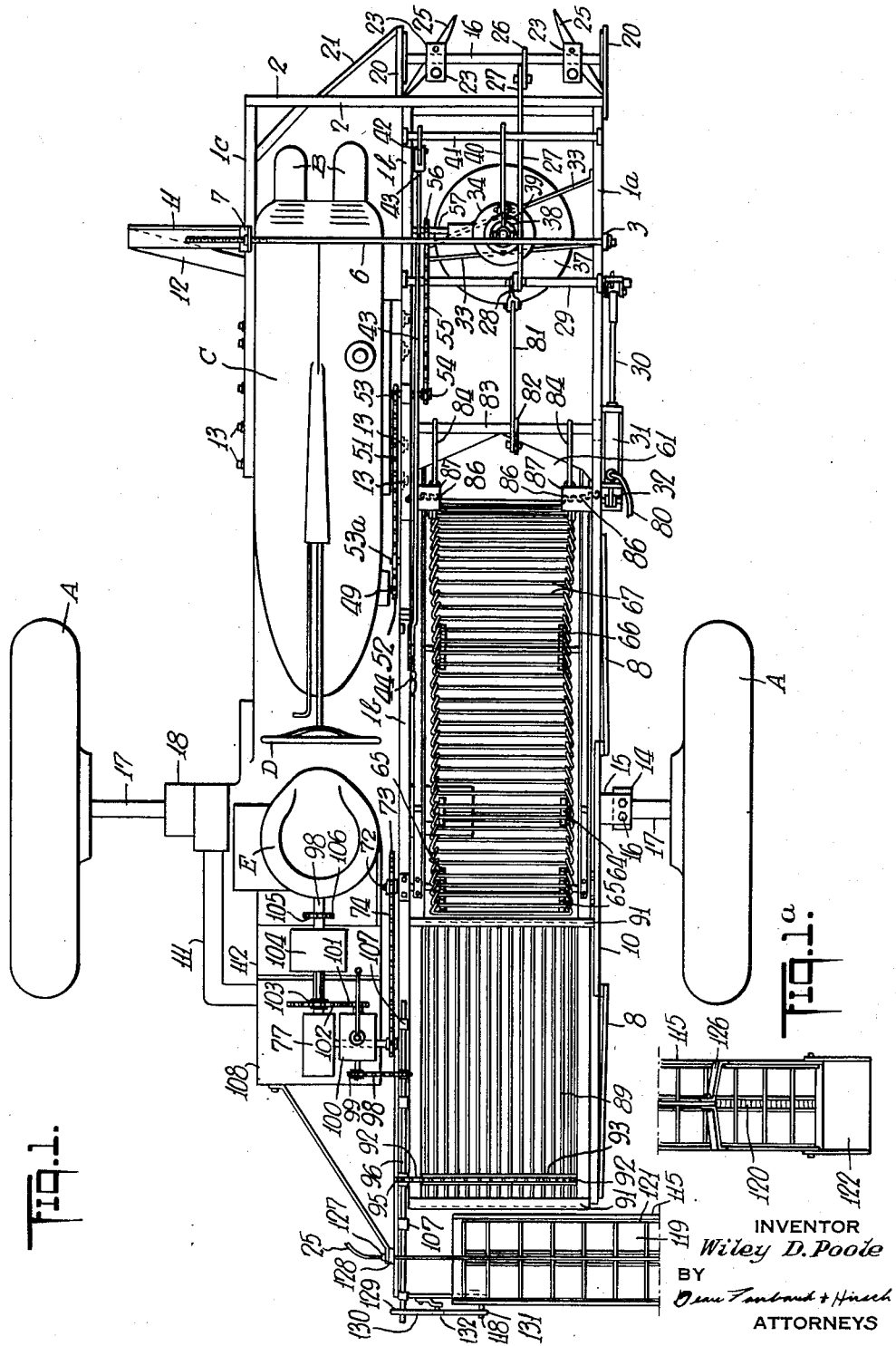
Fig. 1 is a top plan view of the major portion of a machine embodying my invention.

In the harvester construction illustrated there is provided a main frame having three longitudinally extending bars 1$^a$, 1$^b$ and 1$^c$, the main parts of the harvester being disposed between and supported by the bars 1$^a$ and 1$^b$, and the main parts of the tractor being disposed between the bars 1$^b$ and 1$^c$, as shown in Fig. 1. These bars are rigidly connected by a plurality of other frame parts, including a transverse bar 2 at the front end and a frame extending over the motor of the tractor and including a bar 3 extending up from the side bar 1$^a$ and connected at its upper end by a transverse bar 6 to the upper end of a vertical bar 7 on the frame member 1$^c$. The bar 7 may be braced by a diagonal bar 11 connected to a horizontal bar 12 secured to the frame member 1$^c$. The frame bars 1$^a$ and 1$^b$ at their front ends also have a pair of vertical bars 4 braced by diagonal bars 5 and supporting a rock shaft 41, the purpose of which will be later pointed out.

Figure 2:
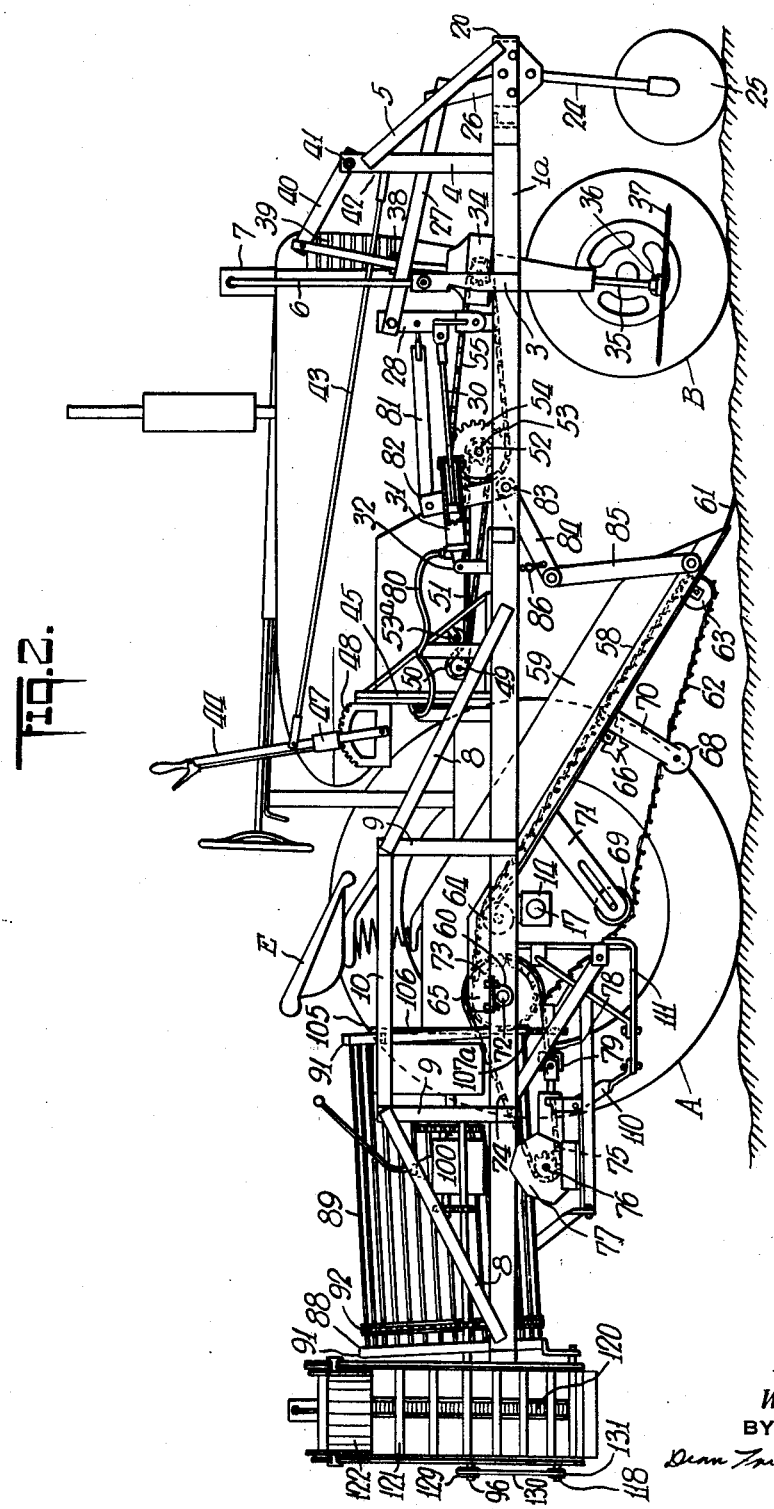
Fig. 2 is a side elevation.

The rear portion of the main frame extends to some distance beyond the rear wheels of the tractor, and as this portion supports the cleaning drum and discharge apparatus, it is reinforced by an auxiliary frame including a pair of vertical bars 9 secured to and extending up from the side bar 1$^a$. These are connected together at their upper ends by a bar 10, and braced by diagonal bars 8, as shown particularly in Fig. 2. The harvester unit may also be secured to the tractor frame by bolts 13.

At the front end of the machine the frame has a transversely oscillating bar 16 on which are mounted clamps 23 for holding depending rods 24 on the lower end of which are discs, coulters or cutters 25. These are freely rotatable about their respective axes, and the axes of the discs are adjusted so that the general planes in which they rotate are at opposite angles to the general direction of travel, and so that their front edges are closer together than are the rear edges. In operation, as the apparatus is moved forwardly by the tractor power, these concave discs pass on opposite sides of the row of plants, cut into and loosen the ground, cut vines and weeds, and push them and the dirt away from opposite sides of the row, in a manner well understood in the art.

To permit the discs 25 to be lifted and held out of contact with the ground when traveling to and from the field, the cross-bar 16 which supports them has an arm 26 connected by a link 27 to a pivoted arm 28 which is secured to a rock shaft 29. A push rod 30 is pivoted to a second arm on the shaft 29, and is connected to a plunger in a hydraulic cylinder 31 pivoted on a bracket 32. The tractor may have a pump which when operatively connected to the engine may pump liquid to the cylinder 31 through a hose 80, and thus push the rod 30, oscillate rock shaft 29, swing the connected arms 26, 28, rotate the bar 16, and swing the discs upwardly away from the ground.

In the rear of the coulter discs 25 and between them, means are provided for cutting off the tops of the plants at any desired distance above the ground. As shown, there is provided a disc cutter or topping blade 37 which rotates about a substantially vertical axis. This top cutting disc 37 is preferably slightly tilted from the horizontal, so that the rear edge is a little higher than the front edge. Thus, as the tops are cut off they are lifted slightly, and as they fall on the disc they are thrown off sideways away from the row.

As shown, this disc 37 is carried by an upright shaft 35 journaled in a housing 34 for the driving means, the housing being secured to the main frame by transverse members 33. The upper end of the shaft has a coupling bearing 38 to a link 39 connected to one arm 40 of a bellcrank lever pivoted on a rock shaft 41. The other arm 42 of the lever is connected by a link or rod 43 to a hand lever 44 adjacent to the seat E for the operator. Thus the driver may raise or lower the top cutter so as to cut the tops close to the point where they emerge from the ground.

The gearing in the housing has an input shaft 57 having a sprocket 56 driven by a chain 55 from a sprocket 54 on a shaft 53, which latter is driven through sprockets 52 and 50 and a chain 51 from a shaft 49 driven by the engine, the chain being kept taut by an idler 53$^a$.

In the rear of the top cutter there is provided means which digs into the soil to lift the roots and convey them upwardly and rearwardly, and frees them from most of the adhering soil. This mechanism includes an inclined trough which has side walls or shields 59 pivotally supported adjacent to their rear ends, and in the trough is a conveyor of any suitable form, driven from a shaft 72 at the upper end thereof. At the lower front end there is a shovel or scoop 61 which has rearwardly diverging edges so as to provide a point at the center of the front edge facilitating the entry of the scoop into the soil to lift out the roots.

As shown, the conveyor includes chains 62 resting on flanges of the side walls 59, and connected by bars, rods or slats 67. The chains are supported by and move over sprocket wheels 63, 64, 65, and are driven by sprocket wheels 73 on the drive shaft 60. The chains may be kept substantially taut by pairs of idlers 68 and 69 adjustably mounted on brackets 70 and 71. One pair of these idlers, for instance the idlers 69, may be adjustably mounted on brackets 71 to take up slack in the chains. The upper run of each conveyor chain engages an idler 66 which is eccentrically mounted or of non-circular form, so that in being rotated by the chains it raises and lowers the adjacent part of the conveyor or vibrates it, and thereby facilitates the freeing of roots from adhering soil and the dropping of the soil between the slats.

The shaft 60 may be driven from the engine of the tractor in any suitable way, as for instance, a sprocket wheel 73 on the shaft 72 may be connected by a chain 74 to a sprocket 75 of a shaft 76 extending from a bevel gear box 77, the gears of which are driven from the power take off shaft 78 of the tractor through a universal coupling 79.

As previously noted, the discs, coulters or soil looseners may be raised to inoperative position when moving to and from the field where the harvesting is to be done. In my machine the root elevator is so connected to the discs or coulters that both may be raised simultaneously. As shown, the arm 28 which is connected to the coulters by parts 24, 26 and 27, is also connected by a link 81 to a bell crank lever including an arm 82 on a rock shaft 83. A pair of arms 84 are connected by links 85 to the lower front end of the root conveyor and scoop at opposite sides of the latter. Thus, by means of the hydraulic cylinder 31 the arm 28 may be swung forward and the coulters are swung upwardly and rearwardly, and at the same time the links 85 lift the root digger and conveyor about the shaft 60 as a center.

The coulters and the root digger may be lifted by applying oil pressure to the plunger in the cylinder 31 or they may be lifted by hand, if desired, and they may be held in any desired raised position by chains 86 connected to the arms 84. Links of the chains may be moved into or out of slots in brackets 87 on the frame side bars 1ª to hold or release the parts. The chains serve as means for limiting the depth to which the digger and scoop may be lowered into the earth, as well as to hold it up when moving to or from a field. For hand operation the double acting cylinder 31 may be entirely omitted.

As one of the important features of my root harvester the root elevator delivers the roots into one end of a drum which is open at both ends and has its rear end slightly lower than the front end, so that the roots move rearwardly in the drum as the latter is rotated. The axis may be at about 3° to the horizontal. As shown, the drum is formed of a pair of rings 88 connected by an annular row of bars 89 so spaced that as the drum rotates dirt is loosened from the roots and may fall through to the ground as the drum is slowly rotated. The drum may be supported in any suitable way, as for instance by a plurality of rollers 90 spaced apart and mounted in each of two frame members 91 which encircle the rings 88, so that as it rotates the roots slowly move rearwardly while the adhering dirt is loosened and falls between the bars 89 back to the ground.

The drum may be rotated from the engine of the tractor by any suitable driving connections. As illustrated, there is provided a drive chain 92, the links of which engage sprocket teeth on a band 93 encircling the drum adjacent to the rear end thereof, and also engaging a sprocket wheel 95 on a jack shaft 96 mounted in bearings 107 on the frame. This jack shaft may be driven in any suitable manner from the engine of the tractor. As shown, it is connected to the three-speed selective transmission 100 by a chain 98 on a pair of sprocket wheels 97 and 99. This transmission 100 is connected to a reduction gear box 104 through sprocket wheel 101, chain 102, and sprocket 103. The reduction gear box 104 is connected to the power take-off shaft 78 of the tractor by sprocket wheel 105, chain 106 and sprocket 107a.

The bevel gear drive 77 is mounted on a platform 108 which is secured to the rear of the tractor frame by bars 109 which are secured to the tractor draw bar 111 by a brace 110. The reduction gear box is mounted on a platform 112 which supports the three-speed transmission 100, and this platform is secured to the rear of the tractor by braces 113, and secured to the platform 108 by braces 114.

The roots having been freed from adhering dirt spill out of the rear end of the drum, due to the slight inclination of the axis of the latter, and are received by an elevator or conveyor which moves them upwardly and laterally and discharges them into a wagon alongside of the harvester. As shown, this elevator has a frame formed of light pipes 115 which supports shafts 118 having thereon pulleys 116 and sprockets 117. The conveyor includes a belt 119 connected to a center chain 120, and having a series of transverse slots 121. At the lower end of the conveyor and adjacent to the discharge end of the drum is an apron 122 which directs the roots onto the conveyor as they spill out of the drum.

The elevator frame members 115 are attached to the main frame of the harvester by supports 123 and 124, and may be swung upon the axle of the lower pulley 116 when the discharge end of the conveyor is raised or lowered. This raising and lowering may be effected by a cable 125 attached to a bracket 126. The upper end of the cable may be secured in any suitable manner, as for instance by a clamp 127 on the cable and engaging the far side of frame member 128, which may have a hole through which the cable passes.

The conveyor is driven from the tractor, the driving means shown including a V-belt 130 mounted on pulleys 129 and 131, the pulley 129 being on the jack shaft 96 which also drives the drum. The belt is kept taut by an adjustable belt tightener 132.

It will be understood that the specific harvester shown in the drawings and above described constitutes only one of many embodiments of my invention, and that a wide variety of changes may be made in the details of construction and arrangement of parts without departing from the spirit of my invention.

Having thus described my invention what I claim as new and desire to secure by Letters Patent is:

1. A root crop harvester for use with a tractor, an implement frame adapted to be connected thereto, a shovel and longitudinally extending separating and elevating conveyor mounted on said frame, a horizontally rotatable topping disc supported on said frame in front of said shovel, a pair of laterally spaced coulters mounted on said frame in front of said disc, adjusting means connected to said disc for adjusting the vertical position thereof and means independent of said adjusting means operatively interconnecting said shovel and said coulters for effecting the simultaneous vertical adjustment of said shovel and coulters with respect to said frame.

2. A tractor-driven root harvester having an operator's station, in combination; a frame on said tractor; a pair of laterally spaced coulters mounted at the front end of said frame positioned to straddle a row of roots to be harvested and arranged to cut into and loosen the soil, cut vines and weeds and push them and the soil away from opposite sides of said row; a horizontally rotatable topping disc supported on said frame between said coulters immediately to the rear thereof and arranged to cut the top of said roots and to discharge the cut tops by centrifugal force laterally away from said row; a shovel and longitudinally extending separating and elevating conveyor mounted on said frame, said shovel being disposed immediately to the rear of said topping disc; adjusting means connected with said topping disc for adjusting the vertical position thereof and operable from said operator's station; means independent of said adjusting means operatively interconnecting said shovel and said coulters for effecting the simultaneous vertical adjustment of said shovel and coulters with respect to said frame; and means for rotating said topping disc and driving said elevating conveyor from the drive for said tractor and under the control of the operator of said tractor.

References Cited in the file of this patent

UNITED STATES PATENTS

| Number | Name | Date |
|---|---|---|
| 942,626 | Dunham et al. | Dec. 7, 1909 |
| 1,209,848 | Kernan et al. | Dec. 26, 1918 |
| 1,824,376 | Shinn | Sept. 22, 1931 |
| 2,168,966 | De Vries | Aug. 8, 1939 |
| 2,249,394 | Noffsinger | July 15, 1941 |
| 2,458,790 | Messenger | Jan. 11, 1949 |
| 2,468,639 | Sample | Apr. 26, 1949 |
| 2,533,793 | Hamlett | Dec. 12, 1950 |
| 2,537,198 | Wetzel et al. | Jan. 9, 1951 |
| 2,539,881 | Wilkins | Jan. 30, 1951 |
| 2,569,201 | Smith | Sept. 25, 1951 |